United States Patent
Treadwell et al.

(10) Patent No.: US 11,718,536 B2
(45) Date of Patent: Aug. 8, 2023

(54) SOLVENT-FREE SYNTHESIS OF LANTHANIDE OXIDE AND MIXED LANTHANIDE OXIDE NANOPARTICLES

(71) Applicant: National Technology & Engineering Solutions of Sandia, LLC, Albuquerque, NM (US)

(72) Inventors: LaRico Juan Treadwell, Albuquerque, NM (US); Avi Gabriel Bregman, Albuquerque, NM (US); Marissa Ringgold, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 194 days.

(21) Appl. No.: 17/387,417

(22) Filed: Jul. 28, 2021

(65) Prior Publication Data
US 2022/0033272 A1 Feb. 3, 2022

Related U.S. Application Data

(60) Provisional application No. 63/058,189, filed on Jul. 29, 2020.

(51) Int. Cl.
   *C01F 17/241* (2020.01)
   *C01F 17/235* (2020.01)

(52) U.S. Cl.
   CPC .......... *C01F 17/241* (2020.01); *C01F 17/235* (2020.01); *C01P 2002/72* (2013.01); *C01P 2002/82* (2013.01); *C01P 2002/88* (2013.01); *C01P 2004/03* (2013.01); *C01P 2004/32* (2013.01); *C01P 2004/62* (2013.01); *C01P 2004/64* (2013.01)

(58) Field of Classification Search
   CPC ............................ C01F 17/241; C01F 7/235
   See application file for complete search history.

(56) References Cited

PUBLICATIONS

Bandioli, F. et al., "Synthesis and Characterization of Praseodymium-Doped Ceria Powders by a Microwave-Assisted Hydrothermal (MH) Route," Journal of Materials Chemistry, 2005, vol. 15, pp. 1061-1066.

Kumar, A. et al., "Luminescence Properties of Europium-Doped Cerium Oxide Nanoparticles: Role of Vacancy and Oxidation States," Langmuir, 2009, vol. 25, pp. 10998-11007.

Kumar, S. A. et al., "Structural, Morphological and Electrical Properties of Sm—Gd Co-Doped Ceria Thin Flms for Micro-Solid Oxide Fuel Cells," Materials Letters, 2020, vol. 275, 128110, 4 pages.

(Continued)

*Primary Examiner* — James A Fiorito
(74) *Attorney, Agent, or Firm* — Kevin W. Bieg

(57) ABSTRACT

Lanthanide oxides and mixed lanthanide oxides can be produced using furnace or microwave assisted solid-state synthesis. The use of Ln-tri(methylsilyl)amide-based precursors yields spherical nanoparticles. The formation of spherical shaped nanoparticles is likely due to the preferential single-step decomposition of the Ln-TMS as well as the low activation energy to overcome decomposition. Reaction temperature, initial metal ion ratio, and reaction dwell time can be used to control the final nanoparticle size. The method enables solvent-free, high-yield synthesis of morphology-controlled lanthanide oxides.

11 Claims, 9 Drawing Sheets

(56) References Cited

PUBLICATIONS

Hajizadeh-Oghaz, M. et al., The Effect of Solution pH Value on the Morphology of Ceria-Yttria Co Stabilized Zirconia Particles Prepared Using the Polymerizable Complex Method, Journal of Cluster Science, 2016, vol. 27, pp. 469-483.

Barkam, S. et al., "Modulating the Catalytic Activity of Cerium Oxide Nanoparticles with the Anion of the Precursor Salt," The Journal of Physical Chemistry C, 2017, vol. 121, pp. 20039-20050.

Chowdhury, S. and Lin, K-S., "Synthesis and Characterization of 1D Ceria Nanomaterials for CO Oxidation and Steam Reforming of Methanol," Journal of Nanomaterials, 2011, vol. 2011, 157690, 16 pages.

Wang, D. et al., "Synthesis and Oxygen Storage Capacity of Two-Dimensional Ceria Nanocrystals," Angewendate Chemie, 2011, vol. 123, pp. 4470-4473. [This is the Wrong Article; I Requested the Correct One From Lib.

Ealias, A.M. and Saravanakumar, M.P. "A Review on the Classification, Characterisation, Synthesis of Nanoparticles and their Application," IOP Conf. Series: Materials Science and Engineering, 2017, vol. 263, 032019, 16 pages.

Gawande, M.B. et al., "Microwave-Assisted Chemistry: Synthetic Applications for Rapid Assembly of Nanomaterials and Organics," Accounts of Chemical Research, 2014, vol. 47, pp. 1338-1348.

Bradley, D.C. et al., "Low Co-ordination Numbers in Lanthanide and Actinide Compounds. Part I. The Preparation and Characterization of Tris{bis(trimethylsilyl)-1-mido}lanthanides," Journal of the Chemical Society Dalton Transactions, 1973, pp. 1021-1023.

Gnanam, S. and Rajendran, V., "Influence of Various Surfactants on Size, Morphology, and Optical Properties of CeO2 Nanostructures via Facile Hydrothermal Route," Journal of Nanoparticles, 2013, vol. 2013, 839391, 6 pages.

Suresh, R. et al., "Effect of annealing temperature on the microstructural, optical and electrical properties of CeO2 nanoparticles by chemical precipitation method," Applied Surface Science, vol. 273 (2013, pp. 457-464.

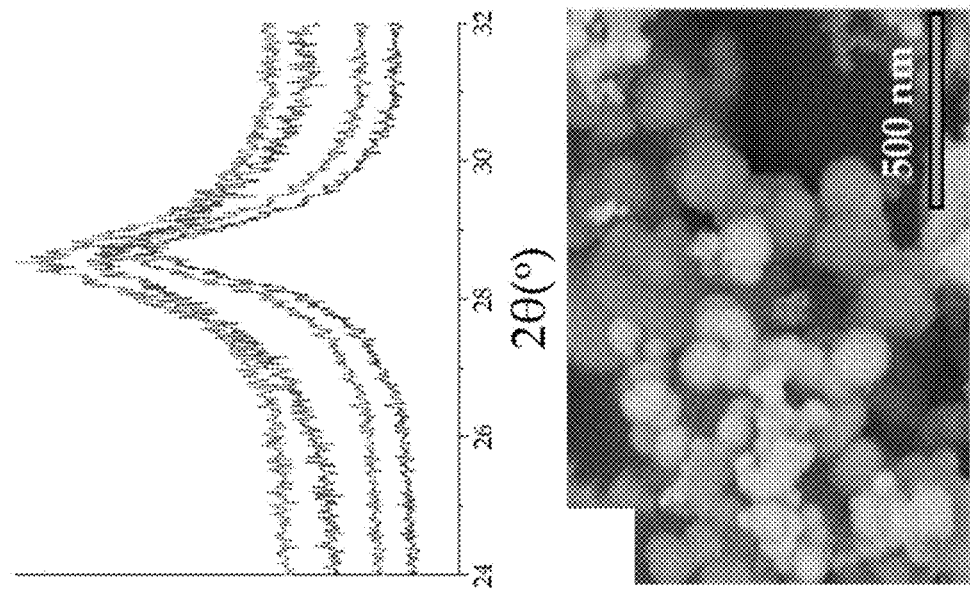
FIG. 2B
FIG. 2C
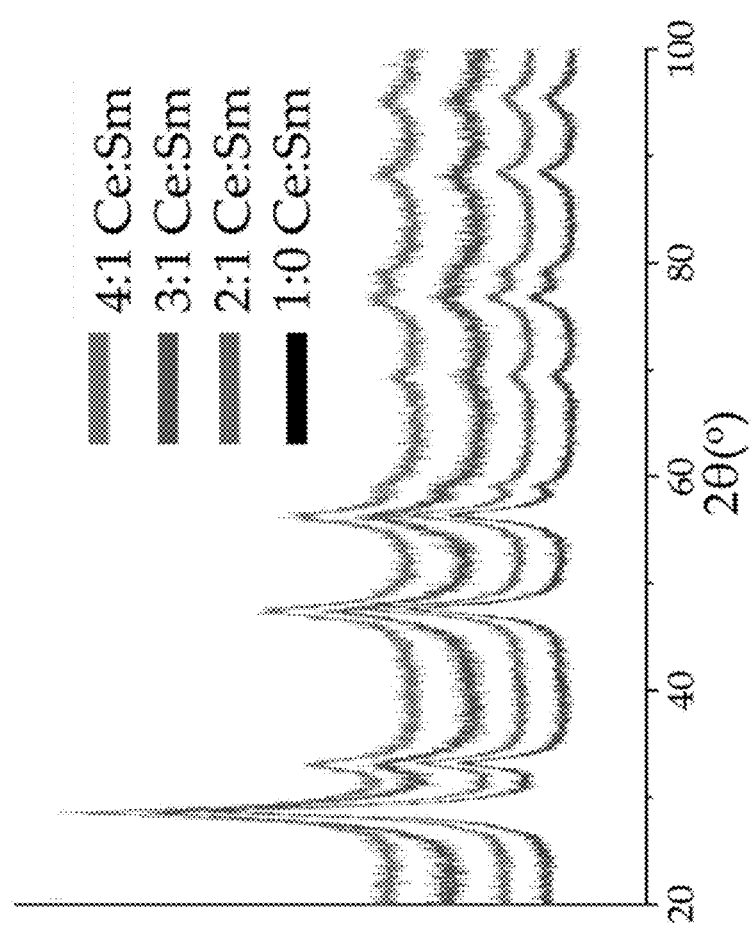
FIG. 2A

US 11,718,536 B2

SOLVENT-FREE SYNTHESIS OF LANTHANIDE OXIDE AND MIXED LANTHANIDE OXIDE NANOPARTICLES

CROSS-REFERENCE TO RELATED APPLICATION

This application claims the benefit of U.S. Provisional Application No. 63/058,189, filed Jul. 29, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to nanoparticles and, in particular, to the solvent-free synthesis of lanthanide oxide and mixed lanthanide oxide nanoparticles using microwave heating or conventional thermal heating.

BACKGROUND OF THE INVENTION

Ceria ($CeO_2$) nanomaterials have found widespread use in sensors, absorbers and fuel cells as a solid electrolyte due to their inherent physical properties, including chemical inertness, ionic conductivity, high dielectric constant, and moderate band gap. See T. S. Stefanik and H. L. Tuller, *J. Eur. Ceram. Soc.* 21, 1967 (2001); D. K. Subbiah et al., *J. Alloys Compd.* 753, 771 (2018); R. Álvarez-Asencio et al., *RSC Adv.* 10, 14818 (2020); S. Vangelista et al., *MRS Adv.* 2, 3005 (2017); and F.-C. Chiu and C.-M. Lai, *J. Phys. D. Appl. Phys.* 43, 075104 (2010). The size of the $Ce^{4+}$ cation (0.96 Å) and its inherent crystal structure allows for easy doping of $CeO_2$ by trivalent lanthanide cations ($Ln^{3+}$); the open structure of the cubic fluorite lattice can accommodate high levels of point defect disorder. See S. Omar and J. C. Nino, *Acta Mater.* 61, 5406 (2013). This property has to led to the development of easily doped $CeO_2$ materials like $Ce_{1-x}Sm_xO_2$ and $Ce_{1-x}Gd_xO_2$. Doping $CeO_2$ with $Ln^{3+}$ cations introduces significant oxygen vacancies which can increase ionic conductivity over neat $CeO_2$. There have been many reports on the synthesis of a number of doped $CeO_2$ materials, but among these new materials, samarium-doped ceria (SDC) has emerged as one of the more promising doped-ceria materials due to the similarities in ionic radii of $CO^{4+}$(0.96 Å) and $Sm^{3+}$(1.09 Å) that allows the solid solution formation. See F. Bondioli et al., *J. Mater. Chem.* 15, 1061 (2005); A. Kumar et al., *Langmuir* 25, 10998 (2009); and S. A. Kumar et al., *Mater. Lett.* 275, 128110 (2020). Upon successful doping, SDC has reported one of the higher ionic conductivities and particularly low operating temperature requirements. See M. R. Kosinski and R. T. Baker, *J. Power Sources* 196, 2498 (2011). For example, Huang et al. showed an increase in the ionic conductivity at 600° C. of nearly two orders of magnitude over neat $CeO_2$ by doping with 23% samarium. See W. Huang et al., *Chem. Mater.* 9, 2240 (1997).

It has been reported that the properties of $CeO_2$-based ceramics are highly dependent on the size, shape, and crystalline phase of the particles. See A. Trovarelli and J. Llorca, *ACS Catal.* 7, 4716 (2017); F. Zhou et al., *J. Phys. Chem. C* 111, 1651 (2007); and H. X. Mai et al., *J. Phys. Chem. B* 109, 24380 (2005). For instance, Mai et al. observed an oxygen storage content of 554 μmol O $g^{-1}$ for $CeO_2$ nanorods compared to an oxygen storage content of 318 μmol O $g^{-1}$ for $CeO_2$ nanopolyhedra. See H. X. Mai et al., *J. Phys. Chem. B* 109, 24380 (2005). Ma et al. utilized a novel hydrothermal method to synthesize SDC nanorods, which due to their increased surface area, displayed a very high power density of 522 $mWcm^{-2}$. See Y. Ma et al., *Adv. Mater.* 22, 1640 (2010). Since the shape-phase-property relationship is very important for various applications, it is critical to establish control over the initial morphology of $CeO_2$ (i.e., morphology, phase, shape, etc.) as a function of $Ln^{3+}$ doping. Previous efforts to tailor the morphology of various $CeO_2$ based nanoparticles have been investigated using commercially available precursors by altering specific synthetic variables, such as pH, precursors, and surfactants. See M. Hajizadeh-Oghaz et al., *J. Clust. Sci.* 27, 469 (2016); S. Barkam et al., *J. Phys. Chem. C* 121, 20039 (2017); and S. Chowdhury and K. S. Lin, *J. Nanomater.* 2011, (2011). Recently, Wang et al. demonstrated the synthesis of $CeO_2$ in the form of stacked nanoplatelets, nano rods, nano squares, and round nanoplatelets using a solution-based synthesis in the presence of different mineralizers. See D. Wang et al., *Angew. Chemie-Int. Ed.* 50, 4378 (2011). While morphological control of $CeO_2$ neat and doped $Ln^{3+}$ has been realized by varying the pH, surfactant, and precursors in solution, there apparently has been no report on the systematic comparison of nonvolatile (commercial hydrate air-stable) vs volatile (in-house non hydrate air-unstable) precursors for the production of neat and doped $Ln^{3+}$ $CeO_2$ nanoparticles.

A broad variety of synthetic processes have been utilized to make $CeO_2$-based nanomaterials including hydrothermal methods, solvothermal methods, co-precipitation, sol-gel, and, microemulsion. See F. F. Muñoz et al., *Nanoscale* 7, 271 (2015); K. Amarsingh Bhabu et al., *J. Mater. Sci. Mater. Electron.* 27, 1566 (2016); N. Shehata et al., *Sensors Actuators, B Chem.* 231, 341 (2016); K. Amarsingh Bhabu et al., *J. Mater. Sci. Mater. Electron.* 27, 1566 (2016); and J. Liu et al., *Mater. Lett.* 65, 143 (2011). While many of these methods have produced high quality materials with good shape and size control, they are reliant on secondary mechanism/catalyst such as surfactants and pH. Furthermore, they can involve aging steps or complex surfactant washing procedures that make them unattractive for large scale synthesis. As an alternative to solution-based techniques, solid-state reactions have the potential for direct preparation of economically viable, high-purity, stoichiometric metal oxide nanoparticles while avoiding many of the aforementioned complexities. See A. M. Ealias and M. P. Saravanakumar, *IOP Conf. Ser. Mater. Sci. Eng.* 263, 0 (2017). Solid-state reactions can also be improved upon by utilizing microwave heating. Compared to conventional heating methods, microwave heating is more efficient, has a more homogenous heating profile, and can lead to higher yields. See M. B. Gawande et al., *Acc. Chem. Res.* 47, 1338 (2014).

SUMMARY OF THE INVENTION

The present invention is directed to the production of Ln-oxides and mixed Ln-oxide nanoparticles using microwave assisted and conventional thermal solid-state synthesis. As an example, uniform spherical $CeO_2$ and doped $CeO_2$ nanoparticles can be produced using cerium tri(methylsilyl) amide-based precursors. Furthermore, by varying reaction conditions such as the molar ratio of reactants, the reaction temperature, and reaction dwell time, spherical nanoparticles with sizes ranging from 20 nm up to 600 nm can be produced. The solid-state synthesis can be readily scaled up, easily controlled, and does not need a solvent or washing, making it an attractive option for producing lanthanide oxide nanomaterials.

BRIEF DESCRIPTION OF THE DRAWINGS

The detailed description will refer to the following drawings, wherein like elements are referred to by like numbers.

FIG. 2A is a PXRD spectra of $Sm_xCe_{1-x}O_{2-\delta}$ prepared with variable starting Ce:Sm ratios. The PXRD inset in FIG. 2B shows the downfield shift in the spectra of $CeO_2$ upon the addition of samarium ions. FIG. 2C is an SEM image of $Sm_xCe_{1-x}O_{2-\delta}$ nanoparticles shows spherical morphology.

DETAILED DESCRIPTION OF THE INVENTION

Figure 1B:
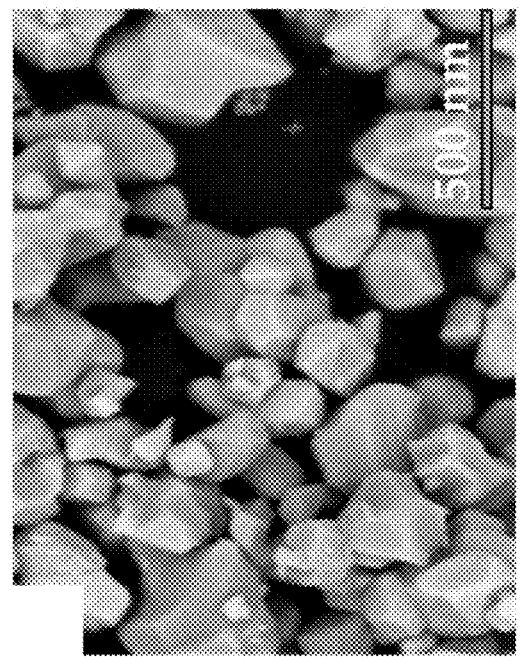
FIG. 1B is a scanning electron microscope (SEM) image of nanoparticles synthesized from a Ce-acetate precursor at a reaction temp of 750° C. and a reaction time of 10 minutes.

According to the present invention, Ln oxide and mixed Ln oxide (binary, ternary, quaternary, etc.) nanoparticles can be made using a systematic synthesis approach that uses varying reaction conditions with Ln-tri(methylsilyl)amide (TMS) precursors. In general, the Ln-TMS precursor can comprise any lanthanide series element. Temperature, dwell time, and chemical composition play a role in the generation of nanomaterials with tailored physical properties (i.e., crystalline phase, size, and morphology). The invention can use a conventional furnace as well as microwave assisted solid-state method with Ln-TMS precursors. Thermal furnace and microwave solid-state synthesis removes the need for solvents of any kind and dramatically reduces the overall reaction time.

As examples of the invention, $CeO_2$ and $Sm_xCe_{1-x}O_{2-\delta}$ mixed oxides were synthesized by microwave assisted solid-state reaction of TMS-based precursors. The use of TMS-based cerium precursors leads to the formation of spherical $CeO_2$ nanoparticles. Additionally, combining TMS-based cerium and samarium precursors leads to the formation of spherical $Sm_xCe_{1-x}O_{2-\delta}$ nanoparticles. Optimization of TMS-based $Sm_xCe_{1-x}O_{2-\delta}$ nanoparticles can be performed by controlling the processing temperature, initial Ce:Sm ratio, and the dwell time at the final reaction temperature.

Microwave Assisted Solid-State Synthesis of $Sm_xCe_{1-x}O_{2-\delta}$ Powders

Synthesis of cerium oxide ($CeO_2$), samarium oxide ($Sm_2O_3$), and samarium-doped cerium oxide ($Sm_xCe_{1-x}O_{2-\delta}$) nanoparticles was accomplished via solid-state microwave irradiation of the respective metal precursors (i.e., cerium (III) nitrate hexahydrate, samarium (III) nitrate hexahydrate, cerium (III) acetate hydrate, samarium (III) acetate hydrate, cerium (III) TMS, and samarium (III) TMS). Cerium (III) TMS and samarium (III) TMS were prepared using established literature routes. See B. Donald et al., *J. Chem. Soc., Dalt. Trans.* 1021 (1973). $CeO_2$ and $Sm_xCe_{1-x}O_{2-\delta}$ nanoparticles were prepared via solid-state microwave radiation of the respective metal precursors (nitrate, acetate, TMS) in the presence of air only. All reactions involving acetate and nitrate precursors were prepared and performed in ambient conditions, while the TMS precursors were handled in a glove box prior heating in ambient conditions. In a standard synthesis method, the precursor was grounded in a mortar to insure a homogenous mixture. After mixing the precursor, the reaction was heated in a Microwave Research and Application BP-210 under atmospheric conditions at a reaction temperature, only using air as the reaction media. For the formation of $Sm_xCe_{1-x}O_{2-\delta}$ various ratios and reaction conditions of Ce-TMS and Sm-TMS, shown in Table 1, were attempted to increase the Sm dopants concentration and control the physical nature of the material (size, morphology, and crystallinity). After the reactions were conducted as described the isolated materials were collected and analyzed without further modifications.

TABLE 1

$Sm_xCe_{1-x}O_{2-\delta}$ Reaction Conditions

| | Reaction Condition | | | | | | | |
|---|---|---|---|---|---|---|---|---|
| | A | B | C | D | E | F | G | H |
| Ce:Sm Ratio | 1:0 | 4:1 | 4:1 | 4:1 | 3:1 | 2:1 | 2:1 | 2:1 |
| Reaction Temperature (° C.) | 750 | 1000 | 750 | 500 | 750 | 750 | 750 | 750 |
| Dwell Time (min) | 10 | 10 | 10 | 10 | 10 | 10 | 5 | 20 |

The robust and diverse physical properties of $CeO_2$ and $Sm_xCe_{1-x}O_{2-\delta}$ have led to numerous investigations detailing the morphological impact on their optical and electronic properties; however, there are no reports on understanding the generation of the aforementioned materials using traditional vs non-traditional precursors in a microwave in the absence of liquid media and surfactant. See S. Gnanam and V. Rajendran, *J. Nanoparticles* 2013, 1 (2013); and R. Suresh et al., *Appl. Surf. Sci.* 273, 457 (2013). Due to the shape-dependent properties of nanomaterials and the void in literature on a microwave assisted solid-state synthesis of various precursors, the effect of traditional and non-traditional precursors on the properties of the resultant $CeO_2$ and $Sm_xCe_{1-x}O_{2-\delta}$ nanoparticles was investigated.

Formation of Spherical Cerium Oxide Nanoparticles

Figure 1D:
FIG. 1D is an SEM image of nanoparticles synthesized from a Ce-TMS precursor.
Figure 1A:
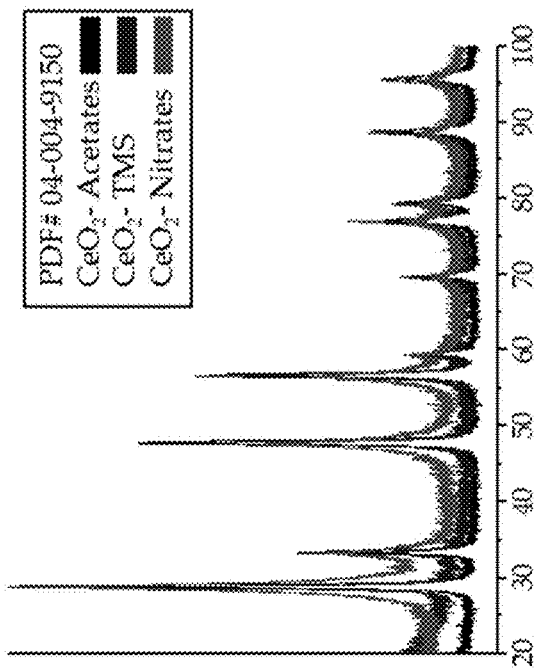
FIG. 1A shows powder X-ray diffraction (PXRD) spectra of powders isolated from the Ce-precursors (acetate, nitrate, and TMS) reaction, confirming that all precursors lead to highly crystalline cerium oxide.
Figure 1C:
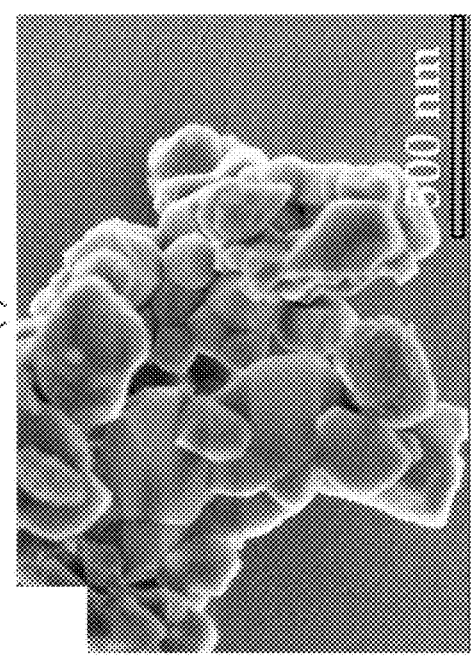
FIG. 1C is an SEM image of nanoparticles synthesized from a Ce-nitrate precursor.

Powder X-Ray diffraction (PXRD) data were collected on the powders isolated from the Ce-precursors (acetate, nitrate, and TMS) reaction. PXRD patterns for each sample are shown in FIG. 1A. For each sample the major peaks of the XRD patterns were indexed to the cubic fluorite $CeO_2$ phase with the space group Fm-3m and no other impurities could be observed in the patterns. SEM images of all products generated from the microwave reaction of the individual Ce-precursors are shown in FIGS. 1B-D. FIGS. 1B and 1C show SEM images of the products formed from Ce-acetate and Ce-nitrate, respectively. For these systems, highly irregular $CeO_2$ nanoparticles are present as well as agglomerated particles. The irregular morphology of the acetate- and nitrate-based $CeO_2$ indicates that there are adsorbed surface species during the conversion reaction, and that transport of ions on the surfaces is not rapid enough to form regular facets based on crystal symmetry. However, FIG. 1D shows that the decomposition of Ce-TMS precursor yields $CeO_2$ nanoparticles with a highly defined spherical morphology. The round spherical morphology of the TMS-based $CeO_2$ system agrees with a rapid decomposition process, wherein cation transport to the nuclei is diffusion limited.

Formation of Samarium-Doped Ceria Nanospheres

Due to the serendipitous generation of spherical $CeO_2$ nanoparticle from microwave irradiation of the Ce-TMS precursor, samarium-doped ceria (SDC) nanoparticles were synthesized by combining Ce-TMS and Sm-TMS precursors. PXRD data were collected on the powders isolated from the different reaction conditions. The crystalline product, $Sm_xCe_{1-x}O_{2-\delta}$, was indexed to the cubic fluorite phase, with no secondary phase present ($Sm_2O_3$; cubic Ia-3 phase). PXRD spectra are shown in FIG. 2A for $Sm_xCe_{1-x}O_{2-\delta}$ generated with initial Ce:Sm ratios of 4:1, 3:1, and 2:1 and a reaction time of 10 minutes at 1000° C. Upon addition of Sm precursors, the PXRD patterns exhibit a downfield shift relative to $CeO_2$ for all the major reflections, as shown in FIG. 2B. The shift to lower angles also shows a dependence on the amount of initial Sm-TMS precursor. The shift to lower angles is due to lattice strain from size mismatch caused by the uptake of different size $Sm^{3+}$ ions, suggesting the successful incorporation of $Sm^{3+}$ in the cubic lattice of $CeO_2$. See J. P. Hos and P. G. McCormick, *Scr. Mater.* 48, 85 (2003). The production of $Sm_xCe_{1-x}O_{2-\delta}$ yielded spherical nanoparticles, as shown in FIG. 2C, indicating that $Sm^{3+}$ ions did not affect the overall morphology.

Figure 3:
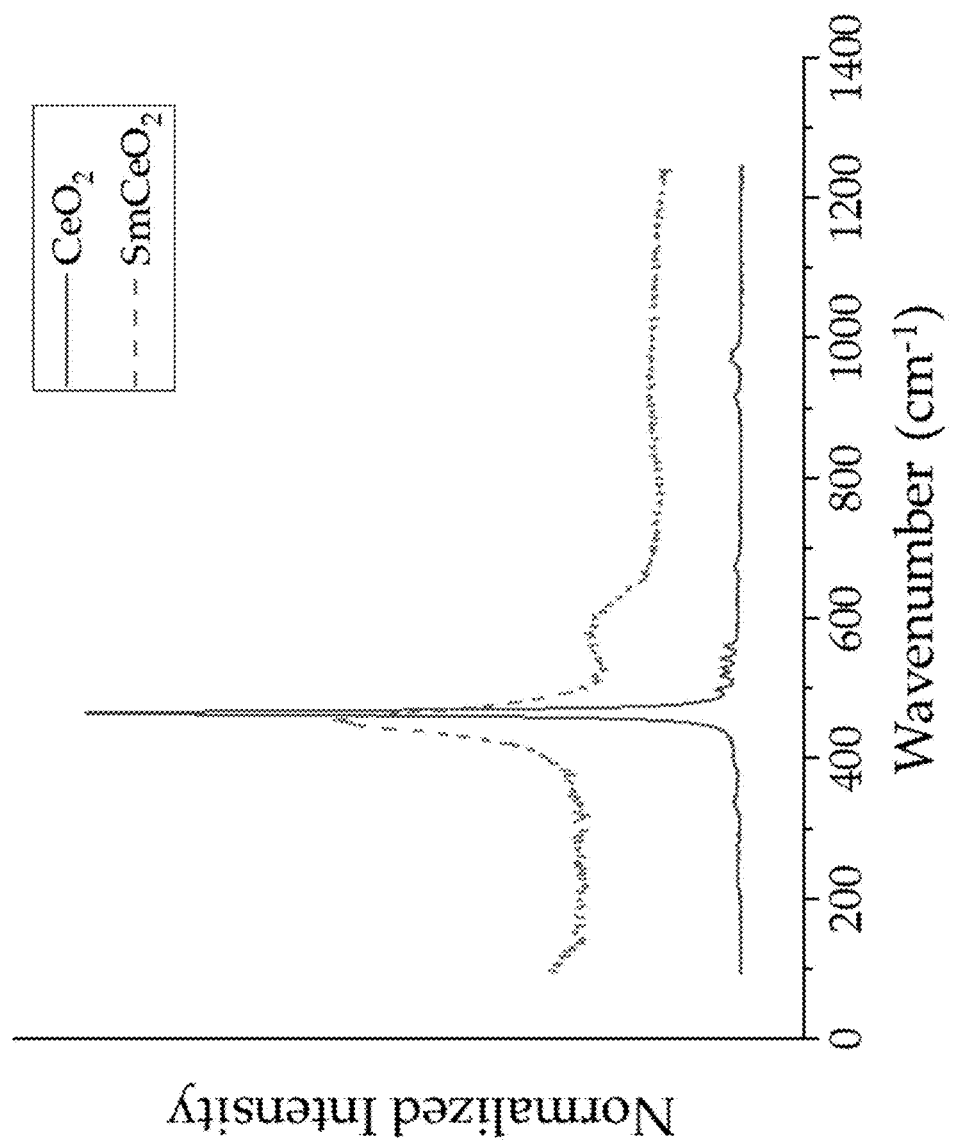
FIG. 3 shows Raman spectra of $CeO_2$ and $Sm_xCe_{1-x}O_{2-\delta}$.

In order to confirm the uptake of $Sm^{3+}$ ions in the cubic fluorite $CeO_2$ lattice as well as to ascertain any structural changes, $Sm_xCe_{1-x}O_{2-\delta}$ powders were analyzed via Raman spectroscopy. Representative Raman spectrum for as synthesized $CeO_2$ and $Sm_xCe_{1-x}O_{2-\delta}$ are shown in FIG. 3. Metal dioxide crystals with the cubic fluorite structure, such as $CeO_2$ only have a single Raman mode, corresponding to the breathing of O atoms around the central metal cation. See V. G. Keramidas and W. B. White, *J. Chem. Phys.* 59, 1561 (1973). The single Raman mode for $CeO_2$ appears at ~460 $cm^{-1}$. Upon $Sm^{3+}$ incorporation in $CeO_2$, the intense singe peak at ~460 $cm^{-1}$ becomes asymmetric, broadens, and shifts to lower frequencies due to increased oxygen vacancy and changes in the lattice structure. The Raman spectra of $Sm_xCe_{1-x}O_{2-\delta}$ also exhibits a second peak at ~570 $cm^{-1}$, which is a direct result of increased oxygen vacancy due to the introduction of $Sm^{3+}$ ions into the $CeO_2$ lattice. See J. R. McBride et al., *J. Appl. Phys.* 76, 2435 (1994). This result is consistent with other reports of $Sm_xCe_{1-x}O_{2-\delta}$. See T. Deng et al., *Bull. Mater. Sci.* 38, 1149 (2015); and S. F. Wang et al., *J. Mater. Res. Technol.* 2, 141 (2013).

Effect of Synthetic Parameters on Nanoparticles Size

Figure 4C:
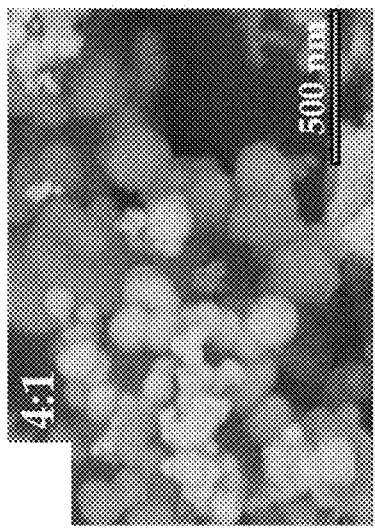
FIG. 4C is an SEM image of $Sm_xCe_{1-x}O_{2-\delta}$ nanoparticles synthesized at 1000° C. The corresponding particle size distributions are shown in FIGS. 4D-F.
Figure 4B:
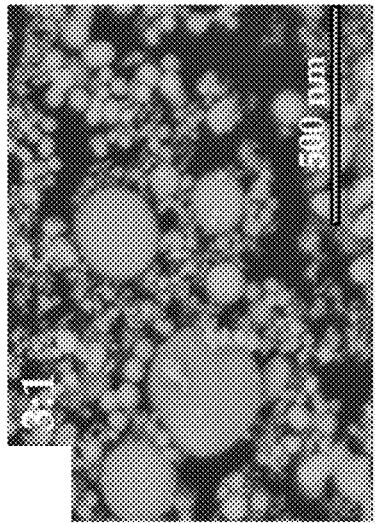
FIG. 4B is an SEM image of $Sm_xCe_{1-x}O_{2-\delta}$ nanoparticles synthesized at 750° C.
Figure 4A:
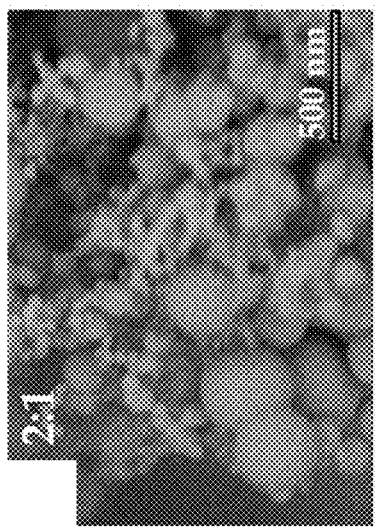
FIG. 4A is an SEM image of $Sm_xCe_{1-x}O_{2-\delta}$ nanoparticles synthesized with a starting Ce:Sm ratio of 4:1, a reaction time of 10 minutes, at a temperature of 500° C.
Figure 4F:
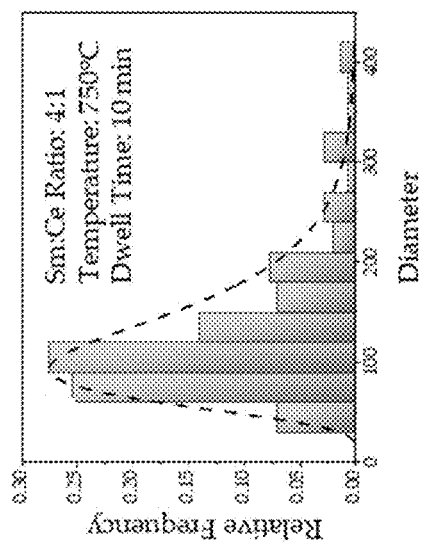
Figure 4E:
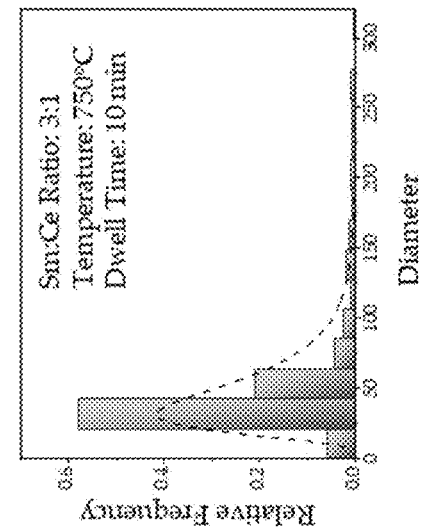
Figure 4D:
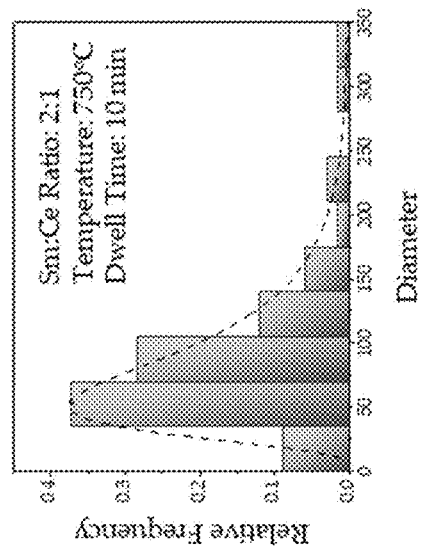

To understand the effect of temperature of the formation of $Sm_xCe_{1-x}O_{2-\delta}$, the original Ce:Sm ratio (4:1) of TMS precursors were investigated at 500° C., 750° C., and 1000° C. for 10 minutes, respectively. SEM images of the product illustrating the temperature effect are shown in FIGS. 4A-C. Spherical nanoparticles were obtained at all temperatures, however, the size of the particles varies. Therefore, to quantify the effect of temperature on the dispersion of the product, the diameter of a statistically significant number of particles were analyzed and plotted in histograms for each reaction, shown in FIG. 4D-F. At a final reaction temperature of 500° C. the majority of the nanoparticles have diameters between 10-50 nm, at 750° C. the average diameter increases to 75-125 nm, and at 1000° C. most particles have diameters between 175-250 nm. It is worth noting that the particle distributions follow a log-normal distribution as illustrated by the overlays on the histograms.

Figure 5A:
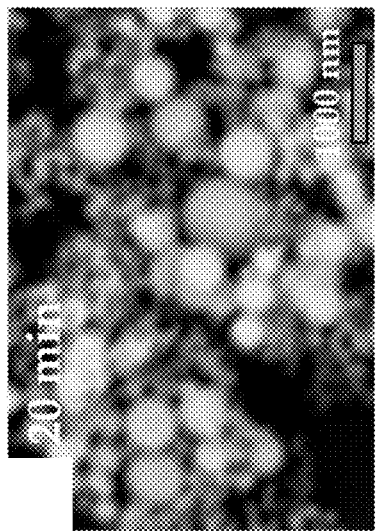
FIG. 5A is an SEM image of $Sm_xCe_{1-x}O_{2-\delta\ \delta}$ nanoparticles synthesized with a starting Ce:Sm ratio of 4:1, a reaction temperature of 750° C., and a reaction time of 5 minutes.
Figure 5B:
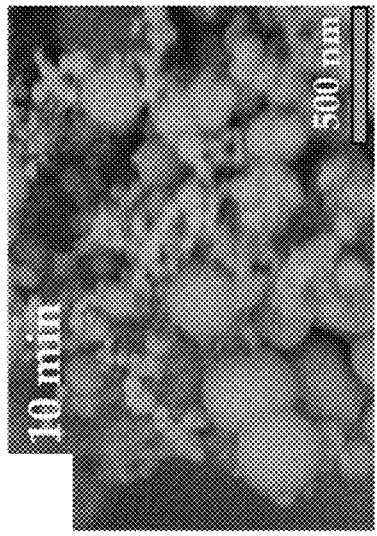
FIG. 5B is an SEM image of $Sm_xCe_{1-x}O_{2-\delta\ \delta}$ nanoparticles synthesized at a reaction time of 10 minutes.
Figure 5C:
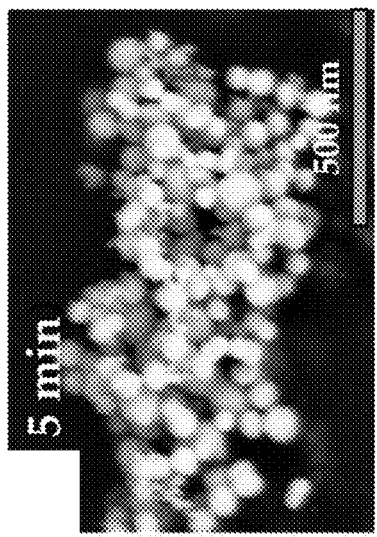
FIG. 5C is an SEM image of $Sm_xCe_{1-x}O_{2-\delta\ \delta}$ nanoparticles synthesized at a reaction time of 20 minutes. The corresponding particle size distributions are shown in FIGS. 5D-F.
Figure 5D:
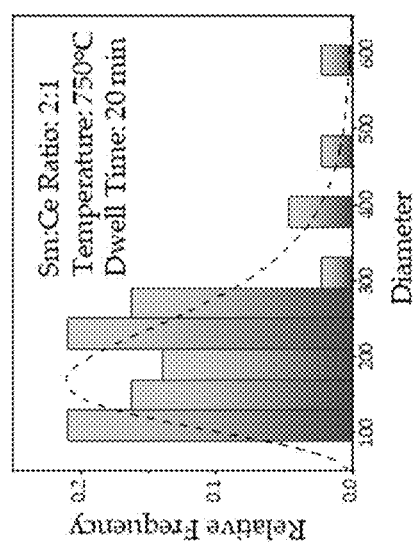
Figure 5E:
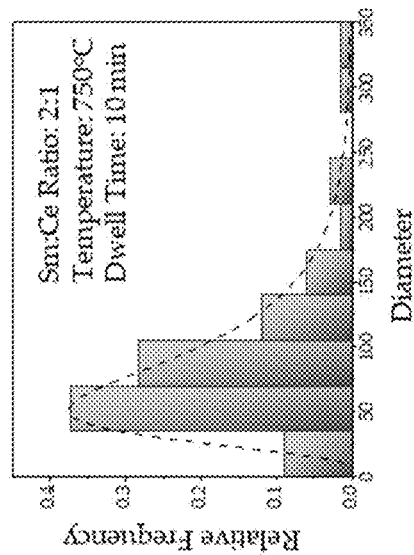
Figure 5F:
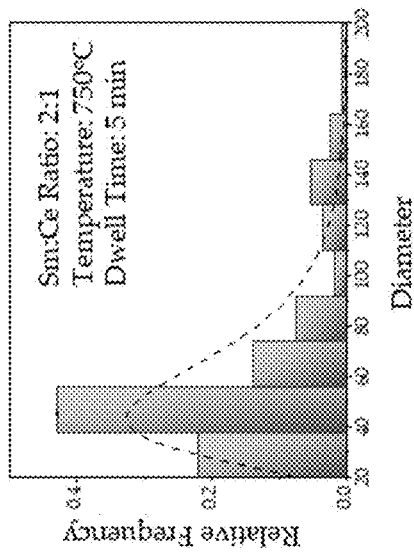

Additionally, the effect of reaction temperature on the formation of $Sm_xCe_{1-x}O_{2-\delta}$ nanoparticles, a Ce:Sm ratio of 2:1 at 750° C. was investigated for dwell times of 5, 10, and 20 minutes, respectively. SEM images of the final products are shown in FIGS. 5A-C. After analyzing a statistically significant number of nanoparticles, it is evident that increasing the reaction temperature increases the average final nanoparticle size, as shown by the histograms in FIGS. 5D-F. An increase in final dwell time leads to an overall increase in final particle size. With all other conditions kept constant, there should be identical nucleation events and the particle size distribution should be identical upon reaction at the final dwell temperature. However, the longer the reaction proceeds at the maximum temperature, more growth will occur, particularly in the form of Ostwald ripening. See A. Baronov et al., *Phys. Chem. Chem. Phys.* 17, 20846 (2015). According to the Gibbs-Thompson description of nucleation, dissolution can occur as the reaction proceeds due to the curvature radius of formed particles. These smaller particles can then be re-dissolved into solution and incorporated into larger particles. See L. C. Varanda et al., *An. Acad. Bras. Cienc.* 91, (2019).

Decomposition Mechanism of $Sm_xCe_{1-x}O_{2-\delta}$ Precursors

Figure 6B:
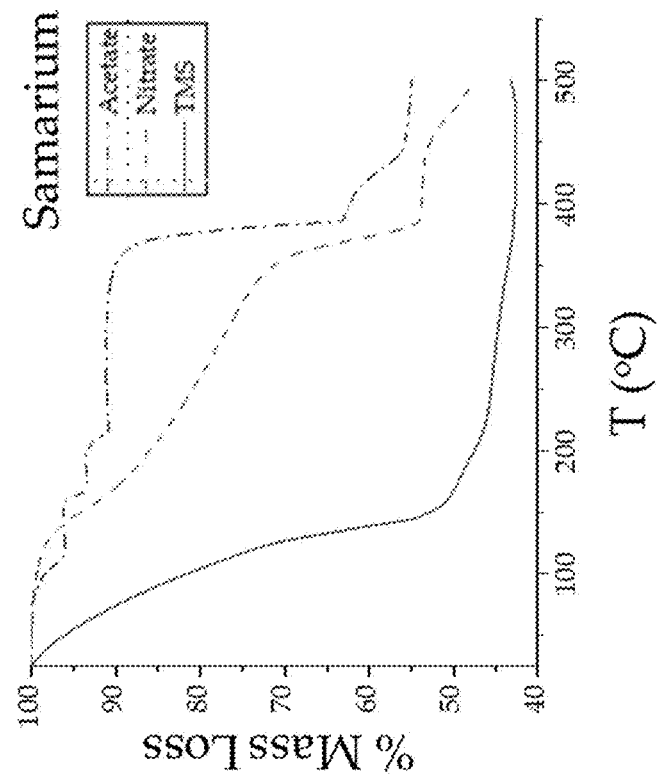
FIG. 6B shows the TGA of samarium-based precursors.
Figure 6A:
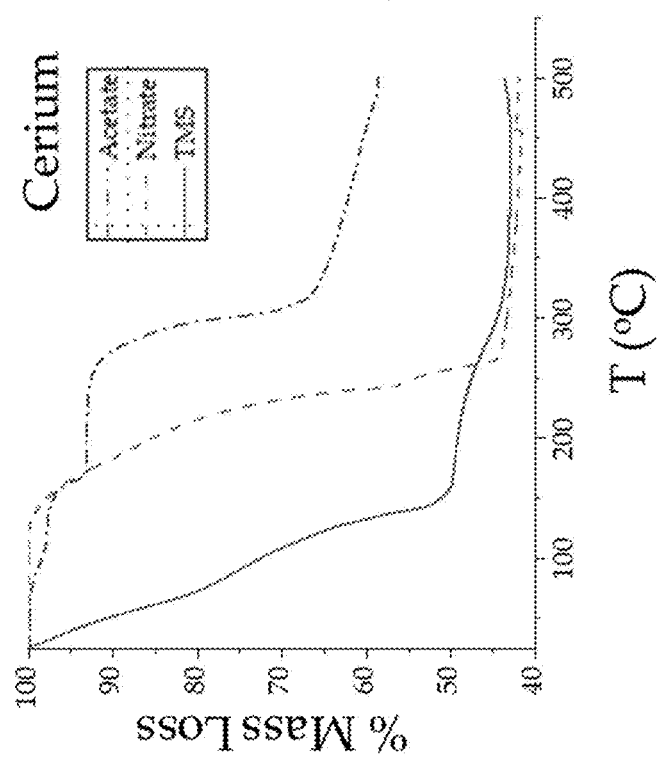
FIG. 6A shows the thermogravimetric analysis (TGA) of cerium-based precursors.

In solid-state reactions, the mechanism by which precursors breakdown plays a major role in the final morphology and properties of the resulting product. To help understand the effect of Ln-precursors on final nanoparticle morphology, the thermolysis properties of the Ln-precursors were studied using TGA as shown in FIGS. 6A and 6B. The commercial Ln-acetate/nitrate precursors display multi-step decomposition as reported elsewhere in literature, whereas Ln-TMS precursors display a single-step decomposition. See P. Melnikov et al., *J. Therm. Anal. Calorim.* 118, 1537 (2014); T. Arii et al., *Anal. Sci.* 17, 875 (2001); and K. C. Patil et al., *Can. J. Chem.* 46, 257 (1968). Additionally, Ln-TMS exhibits a much lower decomposition temperature. For example, Sm-TMS decomposes at ~200° C., but Sm-acetate and Sm-nitrate do not decompose fully until >400° C. The simpler decomposition mechanism and lower decomposition temperature of Ln-TMS are indicators for classical nucleation behavior that can ultimately lead to well defined spherical nanoparticles.

Figure 7:
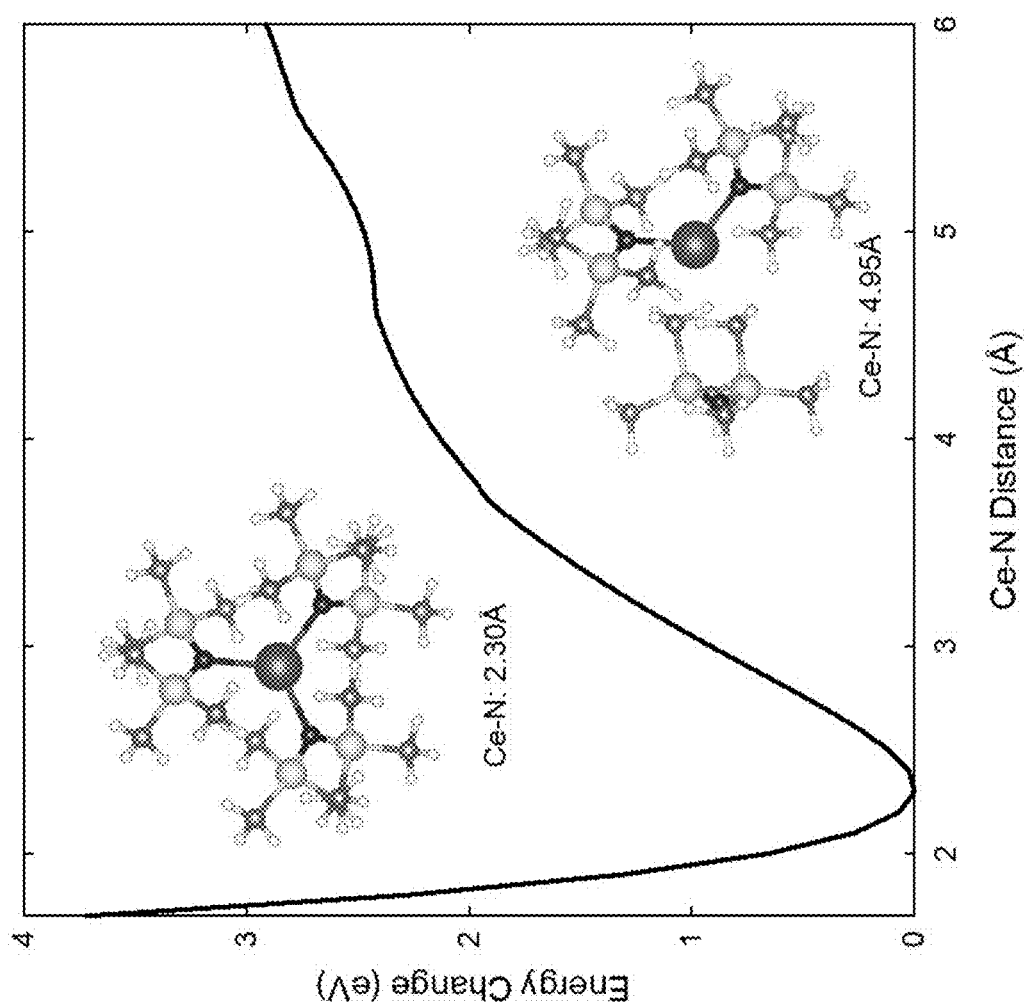
FIG. 7 is a potential energy surface (PES) scan of Ce-TMS molecule. Insets are snapshots of Ce-TMS molecule with Ce-N distances of 2.30 Å and 4.95 Å. Atom colors: Ce (pink), Si (yellow), C (grey), N (blue), and H (white).

To identify the particle nucleation mechanisms, density functional theory (DFT) calculations can provide insight into the breakdown of Ln-precursors. The presence of a single-step decomposition in Ln-TMS precursors suggests that TMS is removed from the Ce/Sm center without the formation of intermediate states. To evaluate the effect of TMS ligand removal, a potential energy surface (PES) scan was performed on Ce-TMS by iteratively stretching the Ce-N bond in 0.05 Å steps and allowing the structure to completely relax. The PES, shown in FIG. 7, does not indicate the formation of significant intermediate states as indicated by the Lorentz potential like behavior. The small change in slope at ~3.6 Å is a result of the methyl groups loosely interacting with the Ce center but is not a strong enough interaction to suggest the existence of an intermediate structure.

Figure 8:
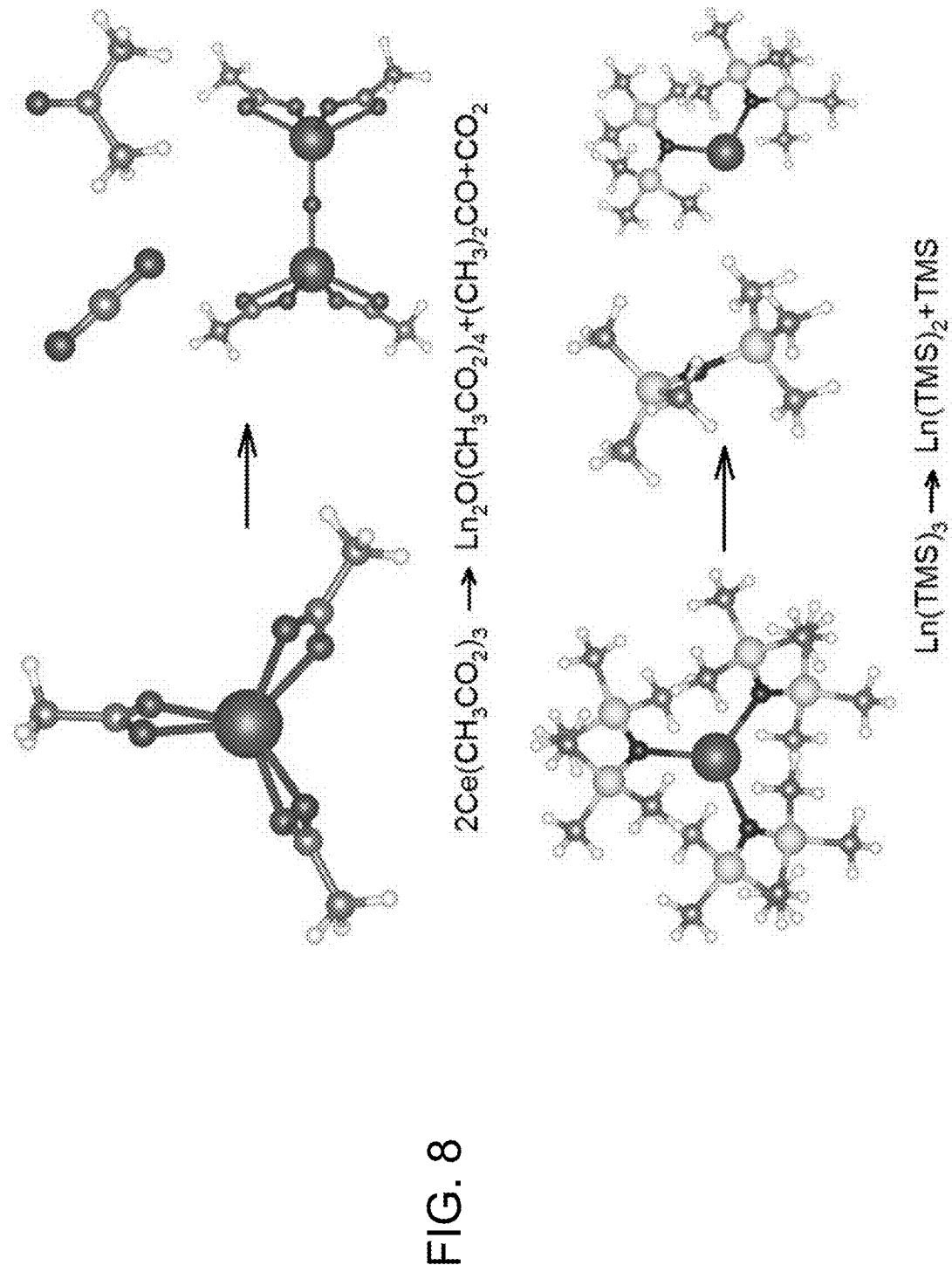
FIG. 8 is a schematic illustration of the first step of decomposition for Ln-acetate and Ln-TMS precursors. Atom colors: Ln (pink), C (grey), H (white), Si (yellow), N (blue).

The effect of intermediate structures can be observed quantitatively by calculating the dissociation energy ($E_D$) of the first decomposition step for Ln precursors. Shown in Table 2 are the pathways and $E_D$ for the first decomposition step of Sm/Ce TMS and acetate-based precursors calculated as the difference between the relaxed energies of the products and reactants shown schematically in FIG. 8. For the cerium precursors, Ce-TMS displays a lower binding energy of −4.348 eV as compared to −1.574 for Ce-acetate. Similarly, Sm-TMS displays a lower binding energy of −3.334 as compared to −1.598 for Sm-acetate. The intermediate structures formed during acetate decomposition result in higher binding energies that make it difficult for molecular species to become available for particle nucleation. Nitrate decomposition also displays a multi-step profile; nitrates are known in molten salt chemistry to break down into nitrite ions before complete decomposition, but provide an oxygen source before full loss. Due to this behavior, it is expected that the binding energies would be in a similar range as that of the Ln-acetate precursors.

Figure 9:
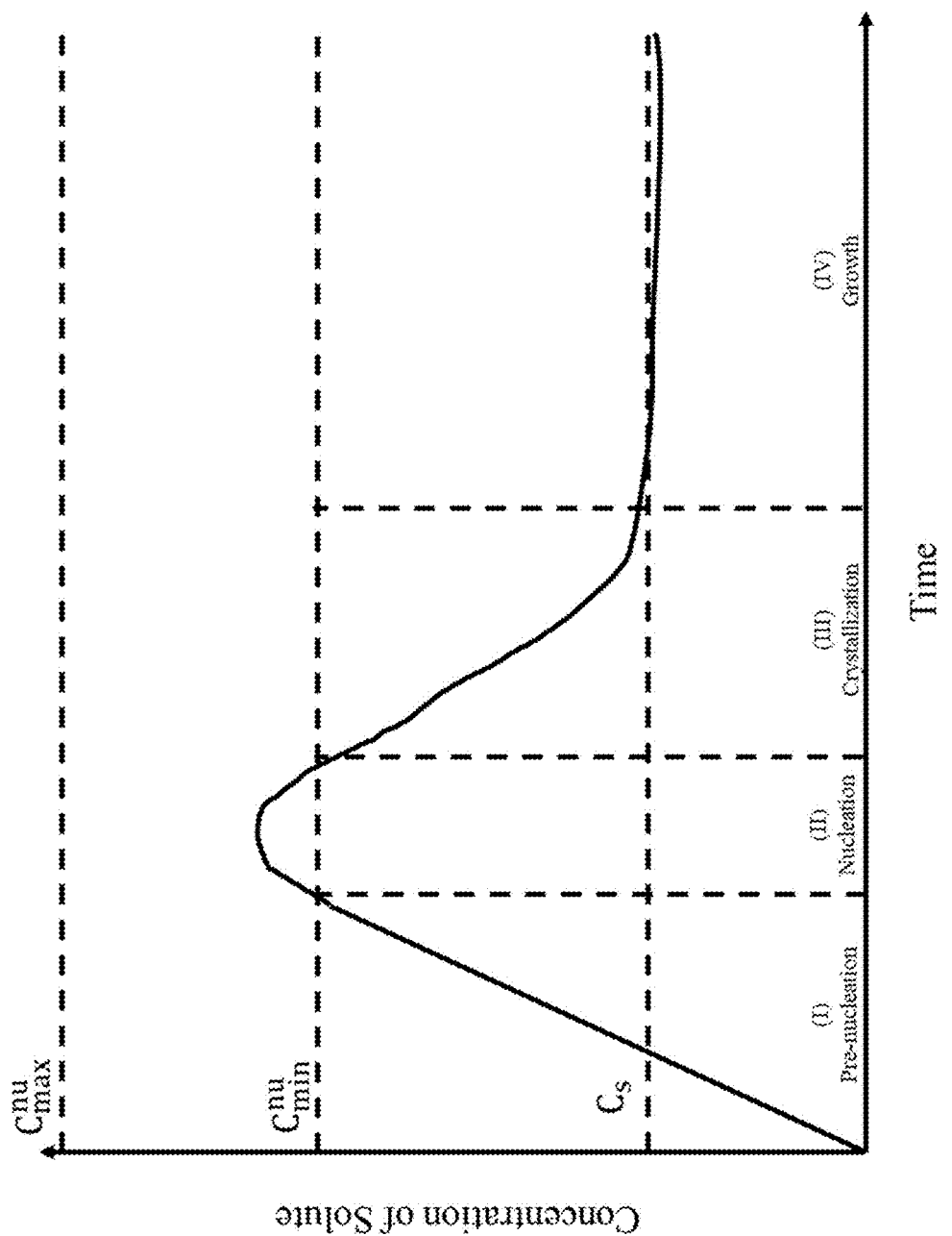
FIG. 9 is a graph showing $Sm_xCe_{1-x}O_{2-\delta}$ spherical nanoparticle formation based on Lamer nucleation theory.

According to the TGA data and relevant calculations, it is apparent that the single-step decomposition of TMS and subsequent formation of spherical nanoparticles falls in line with LaMer's classical nucleation theory, shown schematically in FIG. 9. In step I, the concentration of Ln monomers increases at a steady rate as TMS ligands begin to separate from the metal center. In step II, the saturation of monomers overcomes the energy barrier at some critical solute concentration ($C_{min}^{nu}$) to achieve a burst nucleation event. In step III, crystallization occurs as the concentration of monomers decreases due to continued growth of stable nuclei. In step IV, nuclei continue to grow due to continued monomer diffusion and Ostwald ripening. Spherical nanoparticles are formed due to rapid nucleation followed by the diffusion of readily available monomer species leaving no time for faceted surfaces to form around nuclei. In the case of nitrate- and acetate-based precursors, the multi-step decomposition profiles are indicative of a sol-gel polymerization nucleation mechanism that leads to irregular morphologies as facets form semi-randomly on nuclei surfaces.

The present invention has been described as solvent-free furnace and microwave-assisted synthesis of Ln-oxide and mixed Ln-oxide nanoparticles. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to synthesize lanthanide (Ln) oxide nanoparticles, comprising heating of at least one Ln-tri(methylsilyl) amide precursor at a reaction temperature for a dwell time to produce Ln-oxide nanoparticles.

2. The method of claim 1, wherein more than one Ln-tri(methylsilyl)amide precursor are combined to produce mixed Ln-oxide nanoparticles.

3. The method of claim 2, wherein the mixed Ln-oxide nanoparticles comprise binary, ternary, quaternary mixed Ln-oxides.

4. The method of claim 1, wherein the at least one Ln-tri(methylsilyl)amide precursor comprises cerium (III) tri(methylsilyl)amide or samarium (III) tri(methylsilyl)amide.

5. The method of claim 1, wherein the reaction temperature is greater than 500° C.

6. The method of claim 1, wherein the reaction temperature is less than about 1000° C.

7. The method of claim 1, wherein the dwell time is greater than 5 minutes.

8. The method of claim 2, wherein the Ln-oxide or mixed Ln-oxide nanoparticles are spherical.

9. The method of claim 8, wherein the spherical Ln-oxide or mixed Ln-oxide nanoparticles have a diameter of less than 500 nm.

10. The method of claim 1, wherein the heating is performed in a microwave oven.

11. The method of claim 1, wherein the heating is performed in a thermal furnace.

TABLE 2

Calculated dissociation energies ($E_D$) for the first decomposition step of Ln-acetate and Ln-TMS precursors.

| Precursor | Decomposition Step | Dissociation Energy (eV) | |
|---|---|---|---|
| | | Ce | Sm |
| Ln-Acetate | $2Ln(CH_3CO_2)_3 \rightarrow Ln_2O(CH_3CO_2)_4 + (CH_3)_2CO + CO_2$ | −1.574 | −1.598 |
| Ln-TMS | $Ln(TMS)_3 \rightarrow Ln(TMS)_2 + TMS$ | −4.348 | −3.334 |